US006288389B1

(12) United States Patent
Franzen

(10) Patent No.: US 6,288,389 B1
(45) Date of Patent: Sep. 11, 2001

(54) METHOD OF FAST EVALUATION OF ANALYTICAL MASS SPECTRA

(75) Inventor: Jochen Franzen, Bremen (DE)

(73) Assignee: Bruker Daltonik GmbH (DE)

( * ) Notice: Subject to any disclaimer, the term of this patent is extended or adjusted under 35 U.S.C. 154(b) by 0 days.

(21) Appl. No.: 09/248,131

(22) Filed: Feb. 10, 1999

(30) Foreign Application Priority Data

Feb. 28, 1998 (DE) ........................................... 198 08 584

(51) Int. Cl.[7] ........................... B01D 59/44; H01J 49/00
(52) U.S. Cl. ........................................... 250/282; 250/287
(58) Field of Search ................................... 250/282, 287, 250/281

(56) References Cited

U.S. PATENT DOCUMENTS 4,583,183 4/1986 Winiecki et al. .
5,367,162 11/1994 Holland et al. .

FOREIGN PATENT DOCUMENTS

0774773 A2 5/1997 (EP) .

OTHER PUBLICATIONS

J. R. Chapman; Review Article, Computerised mass spectrometry; J. Phys. E: Sci. Instrum., vol. 13, 1980; pp. 365–375.

J. E. van Montfoort and J. A. Grosz; A simple unit for automatic peak selection in mass spectometry applications; Journal of Physics E: Scientific Instruments 1973, vol. 6; pp. 697–699.

*Primary Examiner*—Bruce C. Anderson

(57) ABSTRACT

The invention relates to a method of fast real time evaluation of mass spectra for analytical methods where in tens of thousands of spectra a day the only result to be established is whether previously known mass signals are present or not present. The invention consists of calculating the positions of those signals within the measured raw data of a spectrum (e.g. the time coordinates of a time-of-flight spectrum) from the known masses by an inverted mass calibration curve, and investigating the raw data for the presence of ion current peaks only at these positions. By weighted summation with special weight functions the signal-to-noise ratio can be improved so that even very small signals can be detected reliably. Data evaluation can therefore be reduced to about one microsecond per expected mass on modern computers so even if there is a large number of expected masses the establishing procedure only takes a few milliseconds. Measurement can even be repeated where necessary if, contrary to expectation, no signal is found. This procedure is completely different from the conventional technique: up to now, at the data evaluation stage the ion currents recorded at fixed time intervals are normally first investigated with regard to the presence of ion current peaks, the associated peak times are then converted to masses with the aid of a calibration function, and the data of the mass spectrum are investigated according to the problem involved.

12 Claims, 1 Drawing Sheet

METHOD OF FAST EVALUATION OF ANALYTICAL MASS SPECTRA

FIELD OF INVENTION

The invention relates to a method of fast real time evaluation of mass spectra for analytical methods where in thousands of spectra per day the only result to be established is whether previously known mass signals are present or not present.

PRIOR ART

In some areas of analysis there is currently widespread talk of the term "High Sample Through-put" (HST), which is defined as a daily sample throughput of 50,000 to 100,000 samples. Partially by so-called "massive-parallel" processing and partially by very fast sequential measurement and preparation methods the samples are pretreated and measured analytically. For sequential measurements with corresponding data evaluation there are only 1½ seconds per sample available in the case of 50,000 samples a day and only about ¾ of a second for 100,000 samples a day, whereby a slight time buffer has to be included for changing sample batches. Mass spectrometry has so far been regarded as a relatively slow method, not only concerning the evaluation of the spectra, which can certainly take many minutes to a number of hours, but also concerning the measurements. However, the argument of slowness does not necessarily apply. Time-of-flight mass spectrometry, for example, with ionization by matrix-assisted laser desorption (MALDI) can definitely be regarded as one of the candidates for such a high sample throughput technology. Particularly the application of MALDI time-of-flight spectrometry to molecular weight determination of oligonucleotides, but also peptides from enzymatic protein digestive matter, makes such a high sample throughput technology not only desirable but also possible. Another field is the analysis of active products in combinatorial chemistry, for which MALDI methods can also be used.

In the meantime methods have become known for massive-parallel synthesis, sample preparation, sample cleaning, matrix addition, and pipetting onto large sample supports for these MALDI methods. Also there are promising approaches toward the accurate and dense preparation of the samples on the sample supports, and for automated, highly sensitive laser desorption without any visual control with very fast and accurate positioning of the samples in the ion source. The problem is therefore particularly reduced to the data evaluation process, which also has to be conducted in the short time period which is available for analysis if no insuperable data pile-up is to occur.

The raw data of a spectrum consist of individual ion current measurements which have been acquired and digitized at a fixed rate and stored in that sequence. The time values of the measurements are not stored as well—they correspond to the addresses of the measured ion current values in the computer memory. Usually the measurements of several individual spectra are already added together for the raw data in order to improve the signal-to-noise ratio. Sometimes there are also checks between the additions to establish whether the newly recorded individual spectrum meets certain quality requirements before it is added to the sum of the individual spectra recorded so far.

A time-of-flight raw mass spectrum obtained by adding individual raw spectra together with a scna over about 100 microseconds consists of about 200 kilobytes of data at a measuring rate of 1 gigahertz, but with the transient recorders already available nowadays, which have a scanning rate of 4 gigahertz, it would consist of about 800 kilobytes of data. With current transient recorders the reading of data alone requires the available time; future transient recorders (which have already been announced) with very fast data transfer buses may be of assistance though. Consequently the problem can be restricted further: only the peak search and conversion of flight times to masses currently still take many seconds per spectrum. However, as described above, only these ¾ second are available for reading the spectra, assessment, addition, evaluation, and storage of the results.

According to current technology not only one spectrum is scanned in those ¾ second but, as described above, several spectra are measured and added together to improve the signal-to-noise ratio. Since the individual spectra are not always reproducible, each individual spectrum is read, investigated for usability by special methods, and then, upon release, added to the sum of the other spectra. So far it cannot be assumed that each spectrum will automatically succeed and produce sufficient mass resolution. However, promising techniques are being developed which minimize frequent production of outlier spectra or even eliminate them completely.

Consequently, in the brief period of less than one second not only does evaluation have to take place, the spectra must also be scanned and added together. For scanning MALDI time-of-flight mass spectra it is known that frequently well over a hundred individual spectra have to be added together before signals are obtained which can be properly evaluated. The scanning rates are limited to about 20 spectra per second though because otherwise the samples become charged, leading to displacements of the ion signals and therefore spectra which cannot be added together.

Therefore one must endeavor to make do by adding about 10 individual spectra. This in turn makes special complicating demands on the recognition of ion current signals, which under these circumstances are often difficult to distinguish against the background noise.

On the other hand, the analysis methods which serve as target methods for high sample throughput (HST) are usually characterized by the fact that they are limited to few responses of qualitative nature per sample spectrum. For instance, mutation analyses of DNA samples are characterized by the fact that only one or two signals are present in the spectrum, and they can appear at a maximum of four or six precisely known molecular masses. All the other ion current signals in the spectrum are irrelevant: they originate either from the matrix substance which has to be added to the sample, from fragment ions, from dimers or oligomers, or from undesirable additives to the actual analyte substance. In the case of biallelic mutations, signals can in principle only occur at two to four known points. In the analysis of microsatellites a correctly measured signal can be found at one out of a maximum of approximately 30 precisely known points. The analysis of products by combinatorial chemistry can produce signals at one location out of a total in the order of 1,000.

OBJECTIVE OF THE INVENTION

It is the objective of the invention to find a method for the evaluation of mass spectra, particularly MALDI time-of-flight mass spectra, which, on the one hand, can be performed in the very short period of time available and, on the other, also guarantees good detection of the signals even under poor signal-to-noise conditions

BRIEF DESCRIPTION OF THE INVENTION

It is the basic idea of the invention that the inundation of raw data of the mass spectrum, stored in a computer memory, is examined only at known memory addresses (corresponding to flight times in our example) for the occurrence of expectable signals. The raw data are not examined for mass peaks continuously and converted to a mass spectrum via a calibration curve, instead the masses of the expectable ion signals are converted to memory addresses by the inverted calibration curve and the stored measurement data are investigated in a stationary manner at the corresponding addresses as to whether a signal is present or not.

In the following the invention is particularly described by the example of the MALDI time-of-flight mass spectra, without limiting the invention to this type of mass spectra For a serial high sample throughput analytical method, there is not much time available, therefore not very many time-of-flight spectra can be added together, as described above. In addition, MALDI time-of-flight spectra frequently show high background noise resulting from the matrix ions which covers more or less the entire time-of-flight spectrum. The reliable detection of weak signals in the background noise becomes the more difficult. For stationary investigation of time-of-flight data for expected signals an improvement in the signal-to-noise ratio and deduction of usually existent background noise must therefore be accomplished.

The background can be simply constant around the ion signal but frequently background changes around the position of the mass peak. In a good approximation it can be assumed that the strength of the background signal changes linearly in the direct vicinity of the ion mass peak.

For an investigation for ion mass peaks in the raw data in the presence of high background noise, usually smoothing functions with wave-shaped weights are applied. If the weighting function has a suitable form, the improvement in the signal-to-noise ratio and the elimination of a linearly changing background are simultaneously performed by this weighted summation.

It is therefore a further basic idea of the invention to perform the stationary investigation for the presence of a signal by weighted summation of the data points around the expected value to increase signal-to-noise ratio and to use a suitable wave form for background suppression. Since in this way a simultaneous background elimination is performed, the result can then be simply compared with a predetermined threshold value of absolute magnitude. If it is exceeded, this indicates that the signal is present. The sum itself can be used as an approximately quantitative value for signal height.

To meet these specifications, a wave-shaped weighting function must be chosen, symmetrical around the center of the expected peak and with the sum over all weights equalling zero. For instance, a wave trough of negative weights with 50% depth, followed by a wave crest of positive weights with 100% height and a further wave trough of negative weights with 50% depth fulfills these requirements, if the wave crests and wave troughs have the same width. The sum of all weights is zero. The weighting function is symmetrical. Preferably, the width of the waves should approximately equal the expected ion peak width.

The form of the wave crests and wave troughs is of secondary importance. Approximately sine-shaped waves can be applied, but also rectangular or trapezoidal waves.

In the processors of most computers, multiplication processes take much longer than additions. If this is the case, with a rectangular weighting function the wave troughs of which have a depth of −1 and the wave crests of which have a height of +2, multiplication in the wave crests can easily be replaced by addition—in the wave troughs no multiplication is necessary but only subtraction. In this way stationary detection of a signal, even with weighted summation extending over approximately 50 measurement values, can be reduced in most computers with a clock rate of several hundred megahertz and data buses of a hundred megahertz to computation times in the order of a few microseconds per expected mass. Even if the investigation is extended to a thousand expected masses it can be completed within a few milliseconds.

If slight displacements occur with the ion current signals in consecutive scans ("jitter"), these can easily be taken into account by slightly widening the wave crests and wave troughs, whereby the deterioration in detectability is only minimal.

If the ion current peaks taper out at one end (heading or footing), the wave troughs can be arranged at a symmetrical distance from the wave crest. This corresponds to the insertion of a series of zero values as weights in the weighting function. As a result the area at both sides of the peak are excluded from the weight sum and the wave troughs required to eliminate background noise are located in an area which is no longer impeded by tapering off.

BRIEF DESCRIPTION OF THE FIGURES

FIG. 2 shows a sine-waved weighting function, FIG. 3 shows a trapezoidal weighting function and FIG. 4 shows a rectangular weighting function. In the rectangular weighting function in FIG. 5, which has narrower waves, distances are integrated between the wave crests and wave troughs, as are favorable for peaks with tapered ends.

PARTICULARLY FAVORABLE EMBODIMENTS

Figure 1:
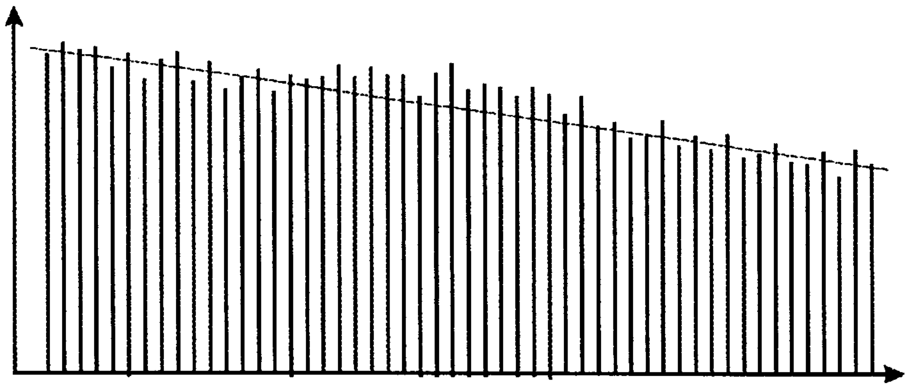
FIG. 1 shows an analog representation of the measured values recorded at intervals of the ion currents with an extremely weak ion current peak which is at the edge of detectability. The background noise drops approximately linearly. The average background noise is indicated by a broken line for easier legibility.
Figure 2:
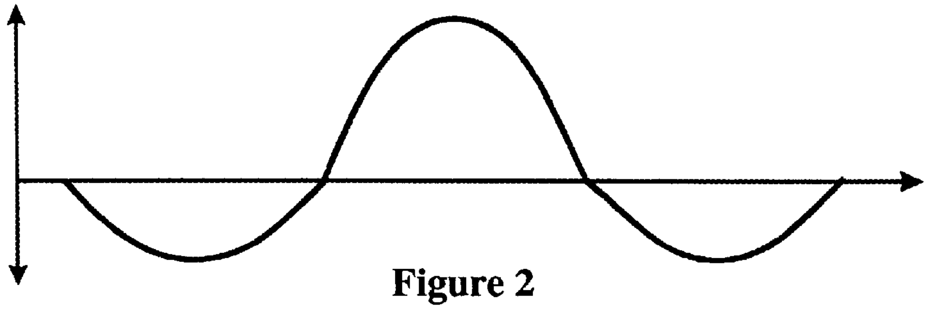
FIGS. 2 to 5 show wave-shaped weighting functions which can be used to detect the signal peak.
Figure 3:
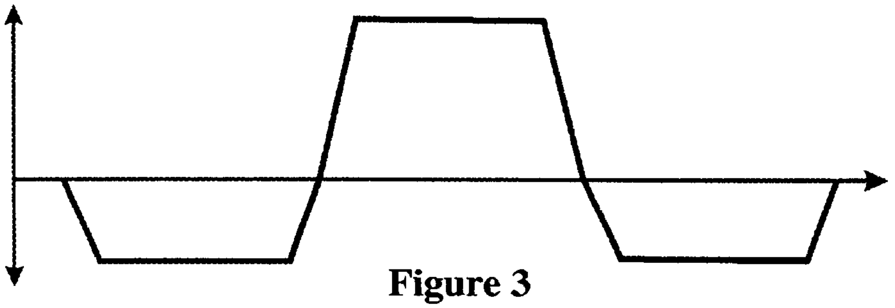

The methods for fast detection of the presence of measuring signals at known points are installed as software processes in the respective mass spectrometers. All these mass spectrometers have internal or external computers to control the measuring procedures and to evaluate the data quantities occurring as measured values after conversion to digital values.

The most favorable embodiment is explained here using time-of-flight spectra as an example. However, the invention should not be limited to time-of-flight mass spectra Any expert in this field will find it easy to also adapt the basic ideas of the invention to the features of other types of mass spectrometer, for example, ion trap mass spectrometers.

In time-of-flight mass spectrometers with MALDI ionization the analyte molecules of the samples, packed in conglomerates of matrix crystals, are applied to a sample support plate in a dense packs. This sample support is placed via an airlock into the vacuum chamber of the ion source of the spectrometer, where it is inserted into a movement device. The movement device can accurately move the individual samples to the axis of the ion source. With special lens systems in the ion source the sample can normally be illuminated and viewed through a videomicroscrope, but viewing will no longer be necessary in the case of automated measurement.

A laser flash of about one to three nanoseconds evaporates a small amount of the matrix substance, whereby molecules of the analyte substance pass into the vacuum where they are ionized. The ions are subjected to a strong acceleration field of about 30 kilovolts, which accelerates them toward the detector. Since heavy ions with the same kinetic energy fly more slowly than light ions, after the flight path in the spectrometer the ions arrive at the detector in the sequence of their masses (or rather their mass-to-charge ratios). The time of flight however is short: even at a flight length of about two meters an ion of approx. 100,000 atomic mass units only takes about 100 microseconds. It is therefore necessary to measure the ion current at a very fast rate of measurement. For this, so-called transient recorders with measurement rates of 100 megahertz up to about 1 gigahertz have proven successful; nowadays transient recorders with 2 gigahertz are available and ones with 4 gigahertz have been announced.

There are already transient recorders with facilities for averaging several consecutively scanned spectra. However, since the individual time-of-flight spectra do not always have the same quality with regard to the resolution of the ion signals, it has proven successful to read out the spectra before their addition and to initially check their quality using some distinct peaks (peaks of the matrix substance for example) before the spectrum is released for addition.

Reading and checking can nowadays take place by using very fast data buses with frequencies of up to about 20 spectra per second. This speed of data acquisition is sufficient because a faster sequence of scanning cannot take place for the following reason: If the ionization processes are too frequent due to the laser bombardment, the sample will be statically charged. This causes a change in the time of flight and the spectra can no longer be added together.

Therefore the aim of time-of-flight mass spectrometry with regard to high sample throughput must be to manage with the addition of about ten individual spectra only. This aim is already achieved with some known types of MALDI preparation but the success, i.e. a spectrum which can be properly evaluated, cannot always be guaranteed with one hundred percent certainty. These ten spectra can be scanned, checked and added together in about half a second with technology which has just appeared on the market. Then there is only one quarter of a second to move the next sample to the axis of the ion source. It is the aim of this invention to also perform evaluation of the mass spectrum in that one quarter of a second, or even faster if possible, in order to be able to take a better sum spectrum from the sample in a second test (for example by adding 20 individual spectra together) in the (rare) case of an unsuccessful procedure. If this additional scan, which takes up about one and a half seconds of additional time, is only seldom necessary, the total target of 100,000 samples per day is still achieved.

When the sum spectrum is available, it has so far been usual to investigate the data quantity of the sum spectrum for ion mass signals using a (usually smoothing) peak search program. The times of flight of the peaks found are then each converted to masses with the calibration curve for the mass scale and produce a so-called “peak list” with masses, peak widths and peak heights which serve as a basis for all further processing steps.

This invention departs from that method completely. Instead, the known masses of possible peaks are converted to times of flight (and therefore to addresses of the stored measurement values in the memory) by inverting the calibration curve. This conversion can be performed for all samples once before scanning proper. At the addresses in the sequence of measured values of the sum spectrum which correspond to the known masses, there is now a stationary inquiry as to the occurrence of peaks This does not take place in a time-consuming procedure but in this case quite specifically at the known point so it can be performed very quickly.

The calibration curve for time-of-flight mass spectrometers has (in a highly simplified representation) the form $m=a\times t^2$, whereby m is mass, a is a calibration constant and t is the time of flight. Therefore (again simplified) an inversion of the calibration curve is produced with $t=\sqrt{m/a}$. In practice the inversion is, however, not so simple because constants and linear elements in t can occur in the calibration function.

Figure 4:
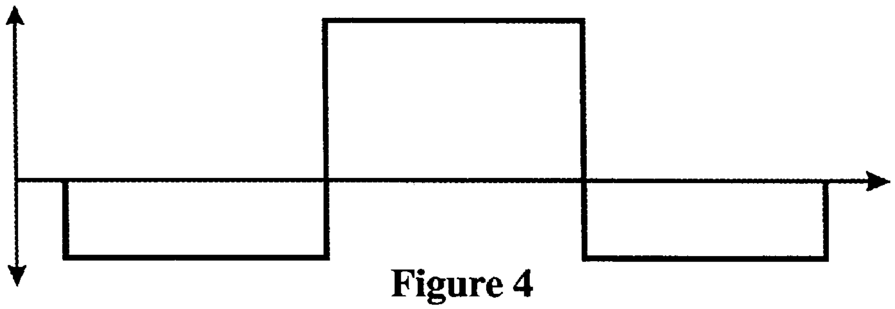

For the computation time it is most favorable to use a rectangular weighting function for detection, as shown in FIG. 4. With this weighting function a weighted peak sum is created over a small part of the spectrum around the expected signal center, and the background is subtracted. The width of the weighting function is selected so that the wave crest is just as wide as the signal to be expected at that point, plus an additional width which corresponds to the jitter of the signal in the spectrum. The weighted signal sum must exceed a preset threshold value and thus indicates the presence of a peak.

The rectangular weighting function has two troughs with a depth of −1, so for the weighted sum the weights do not have to be multiplied by the measured values. In this case the measured values are deducted from the sum. The wave crest has a height of +2, so multiplication is replaced by double addition of the measured value concerned. Therefore, in modern computers which use clock rates of several hundred megahertz the sums above about 50 measured values are generated in a few microseconds. The localization of signal values thus takes a matter of milliseconds, even if relatively large numbers of masses are possible spectrum responses.

If the measured ion currents are stored as integer values, division or multiplication by a factor of two can be easily achieved by a shift of the binary number by one digit to the right or the left.

An even faster way to investigate Peaks is by a rectangular wave-shaped weight function, where the wave troughs have half the width, but the same height as the wave crest. Here only subtractions and additions of measured values for the ion current have to be performed. This case can be preferredly connected with a distance between troughs and crest, where the weights are zero.

Since the weighted sum represents an average peak height over the background, this sum can simply be compared with a preset threshold for peak detection. For example, a threshold which is reliable for detection purposes can be predetermined from spectra scanned in a similar manner.

The very weak peak shown in FIG. 1, which is located approximately at the lower limit of detection, can still be reliably detected with this method. Depending on the necessary reliability of analysis the threshold will be placed higher so as not to obtain false responses due to chance background noise.

Figure 5:
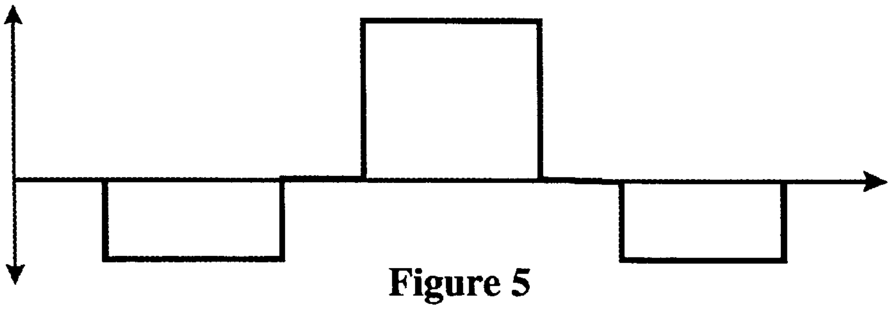

Sometimes the ion current peaks may taper considerably at one end. It is then advisable to detach the wave troughs from the wave crests, as shown in FIG. 5.

If consecutive spectra show relatively small random displacements of the peaks of an ionic type, this effect can be compensated by making the wave crests and wave troughs wider, without seriously affecting detectability.

If peaks of a reference substance added to the analyte sample have to be measured first to overcome problems with possible mass shits, a search of the reference peaks around their expected addresses in the spectrum can be implemented. If the reference peaks are found at some shifted addresses, the shift of their addresses can be used to correct the addresses of all the other sought masses.

For other types of mass spectrometry any expert will be able to independently develop similar methods according to the basic idea of this invention. For example, the ion trap mass spectrometer is also a candidate for high sample throughput if the samples can be successfully fed at a rapid rate. With this spectrometer as well spectra also occur within a short period, although the period is not as short as with time-of-flight spectrometers.

Conventional quadrupole filter mass spectrometers and magnetic sector field mass spectrometers can also produce easily evaluable spectra at measuring rates well below one second. Here too it is only a question of fast sample feed.

What is claimed is:

1. Method for fast evaluation of the raw data of mass spectra of analyte ions with respect to the occurrence or non-occurence of a number of peaks for ions with preknown masses, comprising the following steps:

(1) measuring the ion currents at firm intervals, digitizing the measurement values, and storing these raw data at sequential addresses in a memory, if necessary, repeating the measurements and adding the digitized measurement values correspondingly, (2) converting the known sought masses of the analyte ions, before or after step (1), to memory addresses of the measured raw data by using an inverted mass calibration function, and (3) investigating the stored raw data of the mass spectra in small ranges around the center addresses of the known masses for the presence or non-presence of ion current peaks.

2. Method according to claim 1, wherein the presence of an ion current peak at the address of a known mass is detected when a weighted sum of the measured ion current values around this address exceeds a threshold value.

3. Method according to claim 2, wherein the weighting function for the weighted summation is a symmetrical, three-part wave function with a weight sum equal to zero, with two wave troughs of negative weights at both sides of a wave crest of positive weights.

4. Method according to claim 3, wherein the weighting function for the weighted summation has a wave trough of negative weights of 50% relative strength, a wave crest of positive weights of 100% relative strength, a further wave trough of negative weights of 50% relative strength and with the same width of wave crests and wave troughs so that the weighting function simultaneously produces an improvement in the signal-to-noise ratio and a deduction of the background signal which is either constant or changes linearly along with the ting pulse.

5. Method according to claim 4, wherein the width of the wave crests and wave troughs is the same or slightly greater than the width of the expected ion current signals.

6. Method according to claim 4, wherein the wave function is sine-shaped, trapezoidal or rectangular.

7. Method according to claim 6, wherein the wave is rectangular with constant weights of the value (−1) in the wave troughs and of the value (+2) in the wave crest.

8. Method according to claim 4, wherein between the wave crest and the wave troughs there is a gap in which the weights are zero.

9. Method according to claim 3, wherein the weighting function for the weighted summation has a wave trough of negative weights of 100% relative strength, a wave crest of positive weights of 100% relative strength, a further wave trough of negative weights of 100% relative strength, whereby the wave troughs have half the width of the wave crests.

10. Method according to claim 9, wherein the wave is rectangular with constant weights of the value (−1) in the wave troughs and of the value (+1) in the wave crest.

11. Method according to claim 1, wherein the mass spectrum is a time-of-flight spectrum.

12. Method according to claim 1, wherein in step (2) shifts of reference substance peaks are used to correct the addresses of the sought analyte ion peaks.

* * * * *